UNITED STATES PATENT OFFICE.

LAWRENCE V. REDMAN, OF EVANSTON, AND ARCHIE J. WEITH AND FRANK P. BROCK, OF CHICAGO, ILLINOIS, ASSIGNORS TO REDMANOL CHEMICAL PRODUCTS COMPANY, OF CHICAGO, ILLINOIS, A CORPORATION OF WEST VIRGINIA.

PROCESS OF PRODUCING PHENOLIC CONDENSATION COMPOUNDS.

1,242,592.            Specification of Letters Patent.      Patented Oct. 9, 1917.

No Drawing.       Application filed June 19, 1916. Serial No. 104,494.

*To all whom it may concern:*

Be it known that we, LAWRENCE V. REDMAN, a citizen of Canada, residing at Evanston, in the county of Cook and State of Illinois, and FRANK P. BROCK and ARCHIE J. WEITH, citizens of the United States, residing at Chicago, in the county of cook and State of Illinois, have invented a new and useful Improvement in a Process of Producing Phenolic Condensation Compounds, of which the following is a specification.

This invention relates particularly to the production of condensation products of phenol and substances containing the mtehylene radical.

The invention constitutes a modification of the invention set forth and claimed in our application No. 104,495, filed of even date herewith.

The invention is highly desirable for producing a phenolic condensation product for use as a molding compound, or for other industrial purposes, where a transparent product is not required, and it may be used very advantageously in producing a transparent phenolic condensation product.

The primary object is to provide a process which will enable a substance of this character to be produced on a commercial scale in an exceedingly simple and practical manner, the process being of such character as to make readily controllable the re-actions involved, keep the mass undergoing treatment in such condition as to make it at all times readily handled, and also enable a compound of definite characteristics to be produced with the greatest certainty and under conditions presenting great practical advantages.

In accordance with the improved process, we prepare a fusible, anhydrous condensation product by directly combining a phenolic body, such as cresol, with an active methylene body, such as hexamethylenetetramin, by an anhydrous re-action carried on substantially in the absence of water, using a large excess of the cresol; we then eliminate or blow out of the fusible mass a portion of the free cresol and afterward mix with, or incorporate in, the resin a relatively small percentage of creosote oil, thus obtaining a fusible, anhydrous mass containing both free cresol and creosote oil; and having obtained, by these simple and easily practised preliminary steps, an initial fusible product of a character which is peculiarly adapted to further treatment, we incorporate in, or mix with, the resin, a substance which will furnish sufficient methylene to convert the initial product, at a proper temperature, to a final insoluble, infusible, chemically inert substance which may be termed the final product. The active methylene substance which may be introduced at this point is preferably hexamethylenetetramin; and where pigments are desired, they are usually stirred into the fluid mass at the same stage at which the additional hexamethylenetetramin is introduced.

The process further involves the subsequent mixing of the potentially re-active resin, preferably after it has been cooled and comminuted, with fillers, such as asbestos, mica, flock, wood-pulp, etc., and subsequent treatment to put the material into merchantable form, or in a form enabling it to be readily used as a molding compound, or for other purposes.

In accordance with the preferred method, we first obtain a fusible condensation product of a phenolic body and an active methylene body in the following manner:

Mix 1080 pounds cresol, $(2CH_3C_6H_4OH)$, 140 pounds of hexamethylenetetramin, $(CH_2)_6N_4$; heat the mixture in a vessel or still, while stirring, to a temperature of 140° C.; then turn off the heat and allow the evolution of ammonia to proceed (the temperature automatically rising); apply further heat after the rapid evolution of ammonia ceases, continuing the heat at a temperature of preferably 165° C. for forty-eight hours; then eliminate or drive off a portion of the free cresol, say 10 to 30 per cent. of the original amount, by blowing hot air through the fusible mass while in liquid condition; pour into or mix with the blown mass 78 pounds of cresote oil; pour the mass into a mixer, such as a paint-mixer, the mass being now at a temperature of from 85° C. to 125° C. and having the consistency of a stiff liquid or taffy; add to, or stir into, the mass 120 pounds of hexamethylenetetramin, mix or stir into the mass at the same stage such quantity of dyes or pigments as may be desired, and also a small amount of fats or waxes, preferably 3 to 6 per cent. by weight; and finally cool the potentially reactive resin (now containing both free cresol and free hexamethylenetetramin) in pans; comminute the material, then mix with fillers, roll or mechanically treat the material under such conditions as to fuse or partially fuse the resin and incorporate the filler as an integral part of the body undergoing treatment, the material possessing a body like a heavy tarred sheet of paper after the rolling operation; then break or coarse grind in a grinding-mill, then pulverize in a beater-mill, sift and blend, thus producing a finely granulated product. This powder is salable as a molding compound, and may be molded in heated molds where conversion to the final insoluble, infusible product takes place.

The original batch or mixture contains hexamethylenetetramin in the proportions of about 10 mols. of cresol to 1 mol. of hexamethylenetetramin; and if 10 per cent. of the original amount of the cresol is blown out or eliminated from the mass, we then have what corresponds with about 9 mols. of cresol to 1 mol. of hexamethylenetetramin. After the admixture of hexamethylenetetramin and the fusible material, we have a potentially re-active fusible resin containing both free phenol and creosote oil, the resin corresponding with approximately $5\frac{1}{2}$ mols. of cresol to 1 mol. of hexamethylenetetramin. The amount of hexamethylenetetramin added after the introduction of the creosote oil is approximately 10 per cent. of the weight of the original batch.

The creosote oil employed is a commercial creosote oil, preferably distilling at a temperature of 220° C. to 270° C. As is known, creosote oil is a mixture of cyclic hydrocarbons containing no readily re-active groups. Such a mixture cannot be designated by definite formula. The mixture may comprise, however, a number of cyclic hydrocarbons, such as naphthalene ($C_{10}H_8$), anthracene ($C_{14}H_{10}$), etc. Preferably, the mixture is free from hydroxyl, chlorin, or any readily re-active group. Camphor may be used as a substitute for creosote oil.

The use of more than $1\frac{1}{2}$ mols. of cresol to 1 mol. of hexamethylenetetramin in the original batch tends to enable the materials undergoing treatment to be kept in a desirable fluid condition during the process of manufacture, as well as to prevent the material from passing to such a stage as to prevent the production of the most desirable molding compound, for illustration.

The chief purpose of blowing out a portion of the excess of cresol is to reduce the amount thereof which must be later combined with hexamethylenetetramin by chemical re-action in the heated molds, thus reducing the time necessary for the molding operation. Correspondingly, the amount of hexamethylenetetramin added to produce the potentially re-active fusible resin which is desirable for molding purposes need not be so large as would be the case were all of the free cresol to be left in the mass. The addition of the creosote oil greatly facilitates the further process of manufacture, and the creosote oil finally remains incorporated in the compound without detriment to the final product, but, on the contrary, imparting a desirable plasticity in the molding operation and a higher tenacity, both in the fusible product (when allowed to cool) and in the final product. It has been ascertained that the tenacity of the final infusible product is very greatly improved by the use of the comparatively small amount of creosote oil employed.

While we prefer to remove only about 10 to 20 per cent. of the cresol from the fusible mass first produced, we have discovered that it is possible to drive off a considerably larger percentage of the free cresol and still leave the mass in sufficiently fluid condition to enable the creosote oil to be readily stirred into the resin. It has been found, for instance, that such portion of the free cresol may be removed as to leave a resin corresponding with about $6\frac{1}{2}$ mols. of cresol to 1 mol. of hexamethylenetetramin, the substance being sufficiently fluid at a temperature of, say 100° C., or higher, to enable the creosote oil to be readily admixed. On the other hand, were the cresol in the original batch to be used in much less proportion than that specified, the fluidity would be greatly lessened, the difficulty of controlling the re-action would be increased, and the facility of escape of the ammonia from the boiling mass would be lessened. Even were the amount of cresol to be reduced so as to correspond to 9 mols. of cresol to 1 mol. of hexamethylenetetramin, the facility with which the materials could be treated would be quite materially hampered. Nevertheless, the proportionn may be varied, but it would be desirable to increase, rather than decrease, the percentage of cresol in the original batch. After the nitrogen has been driven off in the original batch in the form of ammonia, the percentage of the free cresol which may be eliminated from the resin may vary greatly without seriously complicating the process of introducing the creosote oil, which, of course, enhances the fluidity, which facilitates the subsequent steps of the process.

After the initial heating operation, the fluid is amber to dark in color; and after approximately forty-eight hours of heat treatment at a temperature of approximately 165° C., the substance remains a dark amber liquid. A temperature of from 125° C. to 210° C. may be used. The length of treatment will vary, depending upon the amount of material being treated, the temperature employed, etc.

At a temperature of 100° C. the material is a somewhat stiff liquid, or thin taffy; and as the percentage of free phenol is reduced by the blowing out operation, the stiffness of the taffy increases somewhat. The substance may be pulled or stretched, like taffy, becoming lighter in color when subjected to repeated stretching.

Any suitable fat or wax may be used with a view to preventing the material from sticking in the molds. Beeswax, stearin, stearic acid, paraffin, etc., are illustrations.

For a batch such as stated, the operation of stirring into the resin the additional amount of hexamethylenetetramin necessary to give the required proportions without converting to the final, infusible product and the pigments usually requires about 15 minutes, the temperature being maintained at from 85° C. to 125° C. The material is poured after the mixing operation, in somewhat the consistency of tar, into shallow pans, and allowed to cool. After coarse breaking, if desired, the material may be more or less finely comminuted in a beater-mill. The material, being in small pieces, may be readily mixed with fillers, wood-pulp, for instance, by means of any suitable mixing apparatus. After incorporation of the filler, it becomes desirable to partially fuse the potentially re-active resin and cause the filler-pulp or fiber to become virtually a part of the re-active resin and ultimately to secure a perfect blend of the materials, thus giving a substantial homogeneity of texture and characteristics throughout the mass of the material. The blending and fusing may be accomplished by mechanical operation, which develops sufficient heat to fuse, or partially fuse, the resin, and a small amount of chemical re-action doubtless occurs in this operation.

The purpose last indicated is preferably accomplished by throwing or feeding a quantity of the dry pulp-like mixture of materials on a pair of revolving rolls which are disposed close together and geared to operate at any desired speed. The friction created by this operation causes the materials to adhere to the rolls. To prevent development of excessive heat, water may be circulated through the rolls. At intervals of a few minutes, the material is cut or peeled from the roll and fed and re-fed through the rolls, which thus perform a thorough mixing and blending operation. It is desirable to prevent the heat from becoming too great, both because too much heat interferes with the free working of the materials on the rolls and also because any advanced stage of re-action toward the final product is to be avoided. Usually a rolling operation of two minutes for a batch of materials thrown on the rolls is sufficient to give the desired blend. The sheets of material are then cut from the rolls; cooled and passed into the grinding-mill and coarse ground; and thence through a beater-mill and finely ground, sifted and blended.

The material is now in suitable condition for use as a molding compound and may be molded in heated molds, where conversion to the final product takes place.

Taken from the rolls as a sheet, the potentially re-active material may be rolled in uniform plate or sheet form, and may be used for various purposes. The material may be heated to plastic condition in open or closed dies, and may be cast or molded, as desired.

The material, either before or after the admixture of filler, may be used for insulating purposes. The same may be said with respect to the use of the material for molding purposes. Various other uses of the compound, either before or after the admixture of the filler, will occur to those skilled in the art.

While it is desirable to add the creosote oil prior to the admixture of the final amount of hexamethylenetetramin, these substances may be introduced and stirred into the fusible mass simultaneously.

The initial fusible product may be dissolved in the usual solvents, such as alkalis, acetone, or a mixture of solvents, and may be used as a lacquer or varnish. If desired, a certain percentage of hexamethylenetetramin may be incorporated in the varnish so that where the varnish or lacquer is subjected to a subsequent heat treatment conversion to the final infusible product will take place.

In the illustration given, a fusible mass is produced by an anhydrous re-action substantially in the absence of water and without the use of a catalyzer. A small amount of water present in the cresol, as an impurity, would not interfere with the practice of the process. Any suitable phenolic body may be used for producing the initial condensation product. Cresol is cheap as compared with phenol proper, and may be used with most excellent results in the process herein described. Any suitable active methylene body which will readily furnish the necessary methylene group ($CH_2$) may be used to produce the anhydrous material, provided it be of an anhydrous character, or substantially so. The active methylene body which is introduced for the purpose of converting the fusible mass to a potentially re-active, fusible resin is preferably an anhydrous methylene substance. Of the methylene-amin substances, hexamethylenetetramin is the most convenient and is not of excessive cost. Where this material is employed, the comparatively small amount of ammonia present in the potentially re-active resin or mixture will act purely as an aid in expediting the re-actions which occur in converting the substance to the final state.

It will be noted as characteristic of the improved process that in the first step of the process the serious difficulties which have so long been experienced in this art by the practice of the old wet formaldehyde process with the attendant difficulties incident to the use of large quantities of water and necessary catalyzers during this stage of producing a phenolic condensation product are entirely obviated; and the mass, after the elimination of a portion of the free cresol and the incorporation of the creosote oil, is left in such a desirable mobile state as to render easy the succeeding steps in producing for illustration, a molding product capable of being quickly converted in the molding operation to the final infusible state. Material of this character may be molded into comparatively large pieces and converted into the final state within a period of approximately 5 minutes, and the molded products possess a high tensile strength, which obviates danger of breakage.

It will be understood that the proportions of the materials may be varied somewhat; also that the steps of the process may be varied somewhat.

As has been indicated, carbolic acid or any homologue, such as cresols, or any other suitable commercially obtainable phenolic body may be used.

In the practice of the process, the ammonia evolved may be collected and used for any desired purpose. For instance, the ammonia may be discharged into a solution of formaldehyde to produce fresh hexamethylenetetramin, and this in turn may be used in the practice of the process. Also, the cresol blown out of the fusible mass may be collected and used again.

Various variations in the details of the process are desirable, depending upon the exact character of the product desired, as will be understood from the foregoing explanation. The foregoing detailed description has been given for clearness of understanding only, and no unnecessary limitation should be understood therefrom, but the appended claims should be constructed as broadly as permissible.

What we regard as new and desire to secure by Letters Patent is:

1. In the process of producing a phenolic condensation product, the step which consists in mixing a phenolic body and an active methylene body in proportions furnishing considerably more than one phenolic group to each active methylene group of the methylene body, applying heat to eliminate ammonia, and afterward eliminating from the mass a portion of the free phenolic body contained therein.

2. In the process of producing a phenolic condensation product, the step which consists in mixing a phenolic body and an active methylene body in proportions to afford a large excess of free phenolic body, subjecting the mixture to the action of heat to produce a fusible resin, expelling a portion of the free phenolic body from the fusible mass, and thereafter incorporating in the mass a cyclic compound having no readily reactive group.

3. In the process of producing a phenolic condensation product, the step which consists in mixing a phenolic body and an active methylene body in proportions to afford a large excess of free phenolic body, subjecting the mixture to the action of heat to produce a fusible resin, expelling a portion of the free phenolic body from the fusible mass and thereafter incorporating in the fusible mass a mixture of cyclic hydrocarbons having no readily re-active groups.

4. The process of producing a potentially re-active fusible condensation phenolic product, which consists in mixing a phenolic body and an active methylene body in proportions to furnish a large excess of free phenolic body, applying heat to produce a fusible resin, expelling from the fusible mass a portion of the free phenolic body, and incorporating in the resin a cyclic hydrocarbon and an active methylene body.

5. The process of producing a potentially re-active fusible condensation phenolic product, which consists in mixing a phenolic body and an active methylene amin body in proportions to furnish a large excess of free phenolic body, applying heat to eliminate ammonia, expelling from the fusible resin a portion of the free phenolic body, and incorporating in the mass a cyclic hydrocarbon and a methylene-amin substance.

6. The process of producing a potentially re-active fusible condensation phenolic product, which consists in mixing a phenolic body and an active methylene body in proportions to furnish a large excess of free phenolic body, applying heat to eliminate ammonia, expelling from the fusible mass a portion of the free phenolic body, and incorporating in the mass a mixture of cyclic hydrocarbons having no readily re-active groups and a methylene-amin substance.

7. The process of producing a potentially re-active fusible condensation phenolic product, which consists in mixing a phenolic body and an active methylene body in proportions to furnish a large excess of free phenolic body, applying heat to produce a fusible resin, expelling from the fusible mass a portion of the free phenolic body, and incorporating in the mass a cyclic hydrocarbon, an active methylene body, and a filler.

8. In the process of producing a fusible phenolic condensation product, the step which consists in mixing a phenolic body and an active methylene body in the proportions of at least one and one-half phenolic groups to each active methylene group of the methylene body, applying heat to produce a fusible resin, and expelling at least substantially ten per cent. of the free phenolic body.

9. In the process of producing a fusible phenolic condensation product, the step which consists in mixing a phenolic body and an active methylene-amin body in the proportions of at least one and one-half phenolic groups of each active methylene group of the methylene body, applying heat to eliminate amomnia, expelling at least substantially ten per cent. of the free phenolic body, and incorporating in the resin a cyclic hydrocarbon.

10. In the process of producing a fusible phenolic condensation product, the step which consists in mixing a phenolic body and an active methylene body in the proportions of at least one and one-half phenolic groups to each active methylene group of the methylene body, applying heat to produce a fusible resin, expelling at least substantially ten per cent. of the free phenolic body, and incorporating in the mass a mixture of cyclic hydrocarbons having no readily re-active groups.

11. The process of producing a fusible potentially re-active condensation product, which consists in mixing a phenolic body and an active methylene body in the proportions of at least one and one-half phenolic groups to each active methylene group of the methylene body, applying heat to produce a fusible resin, expelling from the mass a portion of the free phenolic body, and incorporating in the resin a cyclic hydrocarbon and a methylene-amin substance in sufficient quantity to enable the substance to be converted, under the application of further heat, to a final infusible product.

12. The process of producing a fusible potentially re-active condensation product, which consists in mixing a phenolic body and a methylene-amin body in the proportions of at least one and one-half phenolic groups to each active methylene group of the methylene body, applying heat to eliminate amomnia, expelling from the mass a portion of the free phenolic body, and incorporating in the fusible mass a relatively small proportion of creosote oil, a methylene-amin substance, and a filler.

13. The process of producing a potentially re-active molding compound, which consists in mixing a phenolic body and an active methylene body in the proportions of at least one and one-half phenolic groups to each active methylene group of the methylene body, applying heat to produce a fusible resin, expelling at least approximately ten per cent. of the original quantity of phenolic body from the mass, and incorporating in the resin a relatively small percentage of creosote oil and an active methylene body in sufficient quantity to effect conversion of the compound to the final infusible state by the application of further heat.

14. The process of producing a potentially re-active molding compound, which consists in mixing a phenolic body and an active methylene body in the proportions of at least one and one-half phenolic groups to each active methylene group of the methylene body, applying heat to produce a fusible resin, and expelling at least approximately ten per cent. of the original quantity of phenolic body from the resin.

15. The process of producing a potentially re-active molding compound, which consists in mixing a phenolic body and an active methylene body in proportions to furnish a large excess of free phenol, applying heat to produce a fusible resin, blowing out of the mass a portion of the free phenolic body, and incorporating in the mass a methylene-amin substance sufficient in quantity to effect conversion of the compound to the final infusible state.

16. The process of producing a potentially re-active molding compound, which consists in mixing a phenolic body and an active methylene body in proportions to furnish a large excess of free phenolic body, applying heat to produce a fusible resin, blowing out of the mass a portion of the free phenolic body, and incorporating in the mass a relatively small proportion of creosote oil and methylene-amin substance in sufficient quantity to effect conversion to the final infusible state, and a filler.

17. The process of producing a fusible potentially re-active molding compound, which consists in mixing a phenolic body and a methylene-amin body in proportions to furnish a large excess of free phenolic body, applying heat to eliminate ammonia, blowing out of the resin a considerable percentage of the free phenolic body therein, incorporating in the mass a relatively small proportion of creosote oil and a sufficient quantity of a methylene-amin substance to effect conversion of the compound to the final infusible state, and mechanically treating the compound to effect a substantial fusing and blending, without conversion to the final infusible state.

18. The process of producing a fusible potentially re-active molding compound, which consists in mixing a phenolic body and a methylene-amin body in proportions to furnish a large excess of free phenolic body, applying heat to eliminate ammonia, blowing out of the mass a considerable percentage of the free phenolic body therein, incorporating in the mass a relatively small proportion of creosote oil and a sufficient quantity of a methylene-amin substance to effect conversion of the compound to the final infusible state, and fusing and blending the materials in the compound without effecting conversion of the compound to the final infusible state.

LAWRENCE V. REDMAN.
   ARCHIE J. WEITH.
   FRANK P. BROCK.